United States Patent

Wienert

[15] 3,653,876

[45] Apr. 4, 1972

[54] FERROUS PELLETS

[72] Inventor: Fritz O. Wienert, 394 Roosevelt Avenue, Niagara Falls, N.Y. 14305

[22] Filed: July 11, 1968

[21] Appl. No.: 743,932

Related U.S. Application Data

[63] Continuation-in-part of Ser. No. 464,545, June 16, 1965, abandoned.

[52] U.S. Cl. .................................. 75/28, 75/33, 75/44
[51] Int. Cl. ........................................................... C21b 1/08
[58] Field of Search ............................... 75/3, 5, 28, 33

[56] References Cited

UNITED STATES PATENTS

| | | | |
|---|---|---|---|
| 3,328,161 | 6/1967 | Rausch | 75/33 |
| 3,443,931 | 5/1969 | Beggs | 75/33 |
| 2,855,290 | 10/1958 | Freeman | 75/33 |
| 3,093,474 | 6/1963 | Collin | 75/33 |
| 3,264,091 | 8/1966 | Ban | 75/5 |
| 3,304,168 | 2/1967 | Ban | 75/3 |

*Primary Examiner*—Hyland Bizot
*Assistant Examiner*—J. E. Legru
*Attorney*—Ashlan F. Harlan, Jr.

[57] ABSTRACT

The production of ferrous metallurgical pellets containing sufficient reductant for complete reduction has been accompanied by problems, because the pellets tend to crumble at temperatures in the range of 300°–800° C. This loss of hot crushing strength is suggested herein to be due to the reduction of iron oxide from the trivalent to the divalent state. In accordance with this invention, the reductant is subjected to a controlled oxidation which removes the most active carbon, preventing significant reduction at temperatures below about 900° C. and which preserves the hot crushing strength. Oxidation of the reductant can be carried out before or after pellet formation.

9 Claims, No Drawings

FERROUS PELLETS

RELATED APPLICATIONS

This application is a continuation-in-part of U.S. application Ser. No. 464,545 filed June 16, 1965 now abandoned.

BACKGROUND OF THE INVENTION

1. Field of the Invention

This invention relates to novel pellets containing iron oxide and carbon that are suitable for metallurgical use in the production of metallic iron. It is also concerned with novel procedures for producing such pellets.

It has long been desired to produce metallic iron from fine iron oxide or iron ores. Hitherto this has been accomplished by forming pellets of fine iron oxide and reducing the iron oxide to metallic iron by heating the pellets to temperatures higher than about 900° C. in an atmosphere of reducing gases. The reduction is slow since the reducing gases must diffuse into the pellets and the process is rather expensive because of the high temperature involved, the slowness of the reaction, and the cost of the reducing gases.

2. Prior Art

It has previously been suggested to incorporate finely divided carbon or carbonaceous materials in pellets formed from iron ores. Such suggestions have not, however, been fruitful since when heated to temperatures above 300° C. the pellets become so weak and soft that they break up into dust when handled. This has precluded any practical application of such pellets in the production of metallic iron. Other attempts have been made to utilize pellets containing both iron oxide and carbon or carbonaceous material, but prior to the present invention none has been practical. Some of these attempts are discussed below.

Dahl et al. (U.S. Pat. No. 3,323,901) form pellets of ore, carbon, water and a binder which is either sulfite lye or molasses. The pellets are dried with combustion gases in two stages, first at a temperature up to about 90° C. and then at a temperature up to about 150° C. The pellets are prereduced in a kiln at 900°–1000° C. To facilitate the escape of moisture during drying, the patentees prefer relatively large ore particles.

The U.S. Pat. Nos. of Ban (3,264,091 3,304,168) disclose conventional pelletizing of ore, carbon and fluxes followed by drying with inert gases at 150°–316° C. (300°–600° F.), preheating at 538°–1,093° C. (1,000°–2,000° F.) and firing to produce highly metallized pellets at 1,316° C. (2,400° F.). These operations are carried out on a travelling grate with frequent reversals of gas flow direction so that the entire bed is treated. Ban would prefer a completely neutral gas (N, $CO_2$) but realizes that oxygen-depleted air (preferably less than 10 percent $O_2$) is the cheapest, he economically makes use of it. Further, he recognises that the air will decompose some of the coal and pick up CO and hydrocarbons, which must be burned to keep the gas from becoming reducing. He assumes that the treatment will result in a 20 percent fixed carbon loss and adds reductant with this in mind.

It is, accordingly, an object of the present invention to produce pellets consisting essentially of particulate iron oxide and carbon with a carbon content high enough to reduce at least a major portion of the iron oxide when the pellets are heated to temperatures above about 900° C. in a suitable metallurgical furnace.

Another object of the invention is to provide pellets of the character described which produce metallic iron on heating without the need for the diffusion of reducing gases into said pellets.

A further object of the invention is to produce pellets of the character described which retain sufficient strength during heating as to permit their effective and practical utilization in a suitable metallurgical furnace for reduction of the iron oxide to metallic iron.

Other objects and advantages of the present invention will be apparent from the following description thereof.

The foregoing objects are accomplished by forming the pellets in such manner that reaction between the iron oxide and the carbon therein is retarded, particularly in the temperature range from about 300° C. to about 800° C. Such pellets may be heated without disintegration in suitable metallurgical furnaces to temperatures well above 1,000° C., at which temperatures the reduction of the iron oxide to metallic iron proceeds at a rapid rate.

As used herein, unless otherwise specified, the term pellets refers to bodies compacted by pressure, bodies formed by the so-called balling action from particulate material and a liquid, and also to bodies formed from fine materials by other suitable methods. Although with pellets produced according to the present invention the size of pellets is not limited by the difficulty of obtaining proper diffusion of a reducing gas into the pellets, with excessively large pellets the transfer of heat to the core thereof may be very slow. Accordingly, it is generally preferred to produce pellets having diameters in the range from 10 mm. to 25 mm.

As will be apparent from the foregoing, iron oxide-carbon pellets made in the usual manner, though strong enough to stand, without difficulty, handling at room temperatures and temperatures up to about 300° C., become so weak at higher temperatures that they crumble into powder under extremely light pressures. On the other hand, if iron oxide-carbon pellets do not disintegrate until a temperature of about 800° C. is reached, recrystallization, crystal growth, and/or partial fusion apparently become effective to strengthen the pellets and permit them to be used without difficulty in metallurgical furnaces.

It has been discovered by the present inventor that the structure of prior iron oxide-carbon pellets is weakened in the intermediate temperature range from about 300° C. to 800° C. by the reduction of trivalent iron oxide in the pellets to divalent iron oxide.

One of the most effective ways of obtaining iron oxide-carbon pellets with good strength when heated to 800° C. was found to comprise the employment as a carbonaceous reductant of a material which has a relatively low reactivity at temperatures up to about 800° C. This is illustrated in the following example in which the particles of metallurgical coke used as a carbon source are subjected to preliminary, controlled, limited oxidation at temperatures up to 800° C. in air having a normal oxygen content to decrease their activity in this temperature range. It has been found that the control of the oxidation should preferably be such as to result in a loss of fixed carbon by combustion of between 1 percent and 10 percent. The reason for reduced reactivity of the reductant after this treatment is believed to be that the carbon oxidized (and lost) is the most active carbon available, i.e. carbon which would readily form CO. Further, the treatment also drives off remaining volatile matter, reducing available $H_2$. As is known, $H_2$ and CO can reduce iron oxide from the trivalent to the divalent state at temperatures above about 300° C., whereas reduction by solid carbon does not proceed at an appreciable rate until about 1,000° C. is reached. Additionally, increasing the ash to carbon ratio makes the carbon less reactive because the ash remains around the remaining carbon. In each of the examples below, the oxidation was carried out in air having an ordinary oxygen content so that no inert or neutral gases need be used for reducing or are even desirable therefor.

EXAMPLE 1

Metallurgical coke was ground to pass a 24 mesh screen and the portion passing a 200 mesh screen was discarded. The −24 mesh +200 mesh coke particles were treated by heating them in a current of air to approximately 800° C., the weight ratio of air to coke being 1.63:10. The treated coke was then cooled in nitrogen as an inert atmosphere.

Magnetite ore, with an analysis of 67.2% Fe, 3.8% $SiO_2$, 0.5% MgO, and 0.6% $Al_2O_3$ was ground to the following particle size distribution:

| | |
|---|---|
| 10.9% | −24 mesh +42 mesh |
| 23.5% | −42 mesh +100 mesh |

| | |
|---|---|
| 7.6% | −100 mesh +150 mesh |
| 7.6% | −150 mesh +200 mesh |
| 50.4% | −200 mesh |

A batch consisting of 100 parts of the ground magnetite, 22.4 parts of the treated coke, and 4 parts of limestone (−24 mesh) was pelletized into balls about 20 mm. in diameter with the help of an aqueous solution of sodium silicate. After air-drying, sample pellets were found to have a crushing strength of about 15 lbs. The air-dried pellets were placed in a container having a lid with a venting hole. The container was inserted in an electrically heated furnace in which the pellets were heated to about 800° C. in a period of 50 minutes. Then the pellets were cooled to room temperature in a protective atmosphere such as nitrogen. The hot crush strength, i.e. the force required for crushing, of samples of these heated pellets was then determined in the manner described hereinafter, and found to average 11 lbs.

Another effective way, similar to that described above, to produce iron oxide-carbon pellets with good hot crush strength involves controlled, limited oxidation of the particles of carbon after the pellets are formed. This is illustrated below.

EXAMPLE 2

One hundred parts of hematite ore ground to pass a 100 mesh screen was mixed with 22.4 parts of ground metallurgical coke (−24 mesh +150 mesh) and 4 parts −24 mesh ground limestone. This mixture was pelletized with the aid of an aqueous sodium silicate solution and the resultant green pellets, while still moist, were coated with a mixture made from 12 parts of fine hematite (−24 mesh) and 6 parts of −65 mesh metallurgical coke. The coated pellets were air-dried and were then heated to about 800° C. in 50 minutes while 6 parts of air flowed around the pellets. The average hot crush strength of the heated pellets was 13 lbs.

In the procedure of this example the small, controlled amount of oxygen present during the heating resulted in retarding of the reduction of the iron oxide at the temperatures involved and thus the strength of the pellets was maintained. Each heated pellet was found to have a harder shell about 6 mm. thick around a softer core about 5 mm. in diameter. The hardness of the shell decreased from the pellet surface toward the center illustrating the effect of diffusion of oxygen into the pellets.

In the following two examples a combination of the procedures of the foregoing examples is employed:

EXAMPLE 3

Anthracite having the composition: 85 percent fixed carbon 5.5 percent volatiles, 8 percent ash, 0.5 percent sulfur, 1 percent moisture was ground and screen. The −24 mesh +200 mesh portion was placed in an electric furnace and heated in 30 minutes to about 800° C. in a reducing atmosphere. While holding the anthracite at this temperature for 15 minutes 5 percent of air was admitted to produce a controlled, limited oxidation of the carbon. The heating also reduced the amount of volatiles present. The treated material was then cooled quickly in nitrogen.

A mixture of 100 parts hematite (−200 mesh), 24 parts of the treated anthracite, and 4 parts of −24 mesh ground limestone was pelletized with an aqueous sodium silicate solution and the resultant pellets were air-dried. The dried pellets were heated without access of air in an electric furnace to about 600° C. in 15 min. Then 17 parts of air were introduced during 35 minutes while the temperature was raised to 800° C. The heated pellets were cooled in a nitrogen atmosphere and the hot crush strength determined. An average strength of 14 lbs. was found. The heated pellets had a relatively hard shell about 4 mm. thick.

EXAMPLE 4

A relatively coarse hematite ore was used, the particle size distribution being:

| | |
|---|---|
| 17.2% | −20 mesh +35 mesh |
| 8.8% | −35 mesh +100 mesh |
| 2.01% | −100 mesh +150 mesh |
| 3.6% | −150 mesh +200 mesh |
| 68.4% | −200 mesh |

Pellets were made from 15.5 parts of water and a mixture of 100 parts of the hematite ore, 16 parts of the oxidation treated metallurgical coke described in Example 1, 2.75 parts of −24 mesh limestone and 4 parts of bentonite clay, the latter serving as a binder.

After air-drying, the pellets were heat treated in an electrically heated furnace by raising the temperature of the furnace to 800° C. in 60 minutes. During the first 30 minutes of heating 4 parts of air were admitted to the furnace and during the second 30 minute period, 8 parts of air were admitted. After cooling the treated pellets in a nitrogen atmosphere, the hot crush strength of samples was found to average 19 lbs.

In producing pellets of iron oxide and carbonaceous material according to the present invention, it has been found that obtaining high hot crush strengths in such pellets is aided and facilitated by employing relatively large particles of the carbonaceous material. For example, when employing ground metallurgical coke with hematite ore the use of coke of −24 mesh +200 mesh size gives pellets with a hot crush strength 66 percent greater than pellets in which the coke included a substantial amount of particles smaller than 200 mesh in size. An increase in hot crush strength of 166 percent was obtained when coke of −24 mesh +65 mesh size was used. That satisfactory, even improved, pellets can be obtained when using relatively large particles of iron oxide and/or carbon was not to be expected from prior known practices with ilmenite and chromite ores since it had been thought essential for practical reduction that the particles in the pellets be extremely fine.

The use of relatively coarse carbon particles in producing iron oxide-carbon pellets is illustrated below.

EXAMPLE 5

Metallurgical coke was ground to pass a 24 mesh screen and the portion passing a 65 mesh screen was discarded. The remainder was mixed with hematite ore which had been ground to such fineness that over 90 percent passed a 200 mesh screen and with limestone ground to pass a 24 mesh screen in the proportion of 100 parts ore, 22.4 parts coke, 4 parts limestone. Pellets about 20 mm. in diameter were formed from the mixture by a known method using an aqueous solution of sodium silicate as a binder. The pellets were dried, heated in 50 minutes to about 800° C. in the absence of air, and cooled in a protective atnosphere. The average hot crush strength of the heated pellets was 8 lbs.

It will be seen that the hot crush strength of the pellets resulting from Example 5 is somewhat lower than that of the pellets of Examples 1–4. While for general use in metallurgical furnaces pellets with a hot crush strength of at least 10 lbs. are preferred, in some cases pellets with a lower hot crush strength are usable. For example, a hot crush strength as low as 3 lbs. is satisfactory for pellets that are heated for reduction to metallic iron on a traveling grate, although a greater strength is usually preferred. Under such conditions the pellets are subjected to relatively small stresses during reduction.

The carbon content of pellets produced according to the present invention may be derived from any convenient source subject to the limitations set out herein. Thus anthracite, graphite, and metallurgical or other coke, such as petroleum coke may be used. As stated above, the carbon should be present in pellets accordingly to the invention in an amount sufficient to reduce at least a major portion of the iron oxide to metallic iron when the pellets are heated to temperatures above about 900° C. More carbon can be used, however. In fact, in some instances it may be desired to use carbon in an amount exceeding up to 10 percent the amount necessary for reduction of all of the iron oxide in the pellets.

It has been determined that, in general, carbonaceous material such as metallurgical coke which has a relatively low volatile content will give higher hot crush strength in pellets forming from comparable mixes than carbonaceous materials like bituminous coal that have a high volatile content. This is understandable, in the light of this invention, since the volatiles will either contain reducing gases ($H_2$, CO, etc.) or produce them by reaction with carbon, and the gases will reduce the oxide to the divalent state in the 300°–800° C. range. This effect is quite noticeable. For example, it was found that pellets formed from a hematite-bituminous coal mixture without treatment according to the present invention were, after heating to 800° C., too weak to be removed from the container without crumbling. On the other hand, a similar hematite-metallurgical coke mixture gave pellets which had a hot crush strength of 5 lbs. In general, the content of the volatile matter in the carbon source should not exceed about 4 percent if satisfactory hot crush strength is to be obtained. However, as indicated hereinbefore, the particle size of the iron oxide and carbon and the treatment of the carbon during the controlled, limited oxidation thereof also influence the strength.

The process of the present invention is applicable not only to hematite ore and magnetite ore as illustrated in the foregoing examples, but is also usable with pure or relatively pure iron oxides from other sources and with other iron ores such as goethite and limonite. The principles of the invention may also be applied to improve the hot strength of pellets made of carbon and ilmenite or chromite.

In pelletizing the iron oxide-carbonaceous reductant mixture, any desired process may be employed. The production of pellets from particles is well known and a variety of suitable methods and apparatus are available. Preferred binders for use in pelletizing are sodium silicate, bentonite, and other suitable non-reactive materials, although other binder materials may be used. It is generally desirable, however, to avoid binders such as tar or pitch which on heating form volatile reducing products.

The hot crush strength of pellets was determined by the following method:

A single pellet was placed on a vertically adjustable metal stem clamped to a spring balance and, by adjusting the stem, was raised into a small, vertical tube furnace through which argon was circulated. The furnace was heated electrically with resistance wire and the temperature of the pellet was raised to 800° C. in about 3 minutes. A piston was then lowered into the furnace into contact with the pellet and pressure, readable as weight on the balance, was slowly applied to the pellet through the piston. Breakage of the pellet was indicated by a sudden decrease in weight as shown by the spring balance.

Iron oxide-carbon pellets produced according to the present invention that have a hot crush strength of at least about 10 lbs. may be heated to produce metallic iron by reduction at temperatures from about 1,000° C. to about 1,250° C. in a rotary kiln, passing therethrough in countercurrent to flame gases. The strength and character of such pellets permits their use in this way without a special abrasion resistant coating or the employment of finely divided cushioning material. Consequently, it is possible to charge the reduced pellets directly from the rotary kiln into a melting furnace, thus preserving the sensible heat of the reduced pellets and making additional handling unnecessary. As pointed out above, with careful handling, pellets having somewhat lower hot crush strength are also suitable for reduction under certain conditions.

As shown in the examples, it is usually desirable to add a small amount of a particulate lime-bearing material such as limestone, dolomite, calcium hydroxide, or the like to the pellet mix to combine with sulfur present in the carbon source and/or in the reduction furnace atmosphere. The lime-bearing material may be omitted if desired. When used, it may be present in such amount as is required to form calcium sulfide with the sulfur in the pellets and to form calcium silicates with silica present in the pellets as an impurity. Further, if desired, a small amount of fine lime-bearing material of the type described may be fed with the pellets into the reduction furnace to combine with sulfur in the furnace gases and to form a refractory basic calcium silicate with siliceous slag that may ooze from the pellets at high temperature.

Mesh sizes referred to herein were determined with standard Tyler screens. Percentages and parts specified are, unless otherwise indicated, percentages and parts by weight.

It will be apparent that the present invention is susceptible to certain variations and modifications. It is intended, therefore, that it shall be interpreted as broadly as permitted by the appended claims.

What is claimed is:

1. A process for producing metallurgical pellets having a hot crush strength of at least 3 lbs. and consisting essentially of particulate iron oxide and particulate carbon, which are substantially non-reactive with each other in a reduction reaction at temperatures up to about 800° C., and yielding metallic iron upon heating above 900° C. in a metallurgical furnace, the carbon being distributed throughout said pellets in at least such proportion to the iron oxide as to reduce the major portion of said iron oxide to metallic iron, characterized in that the particles of carbon are subjected to controlled, limited oxidation by heating them, prior to appreciable reduction of the iron oxide in said pellets, to a temperature of about 800° C. in the presence of a limited amount of oxygen.

2. The process of claim 1, wherein said oxidation is controlled to produce a loss of fixed carbon by oxidation of between 1 percent and 10 percent.

3. A homogenous pellet consisting essentially of:
   particulate iron oxide, substantially unreduced; a small amount of a binder;
   a particulate carbonaceous reductant having less than 4 percent volatile matter, in an amount great enough to reduce at least a major portion of said iron oxide;
   said reductant having had removed therefrom 1 percent to 10 percent of its fixed carbon content by controlled oxidation at a temperature in the range from 300° C. to 800° C., and, in said condition, being incapable of significant reduction of said iron oxide at temperatures below about 900° C.; and
   said pellet having a hot crush strength of at least 3 lbs.

4. A pellet as defined in claim 3, in which the particles of carbonaceous reductant are larger in size than 74 microns.

5. A pellet as defined in claim 3, in which a substantial portion of the articles of iron oxide are larger in size than 74 microns.

6. A pellet as defined in claim 3, which additionally contains a small amount of a particulate lime-bearing material.

7. In a process for producing hard, substantially unreduced pellets consisting essentially of particulate iron oxide an amount of particulate carbonaceous reductant sufficient to reduce at least a portion of said iron oxide and having less than 4 percent volatile matter, optional added fluxing material and a small amount of a binder, said process comprising mixing and pelletizing said ingredients, the improvements comprising heating said carbonaceous reductant to a temperature in the range of from 300° C. to 800° C. in the presence of a limited amount of oxygen to oxidize between 1 percent and 10 percent of the fixed carbon of said reductant, whereby said pellets may be heated to about 900° C. without significant reduction of the iron oxide therein.

8. A process as defined in claim 7, in which the heating of the particles of carbonaceous reductant is carried out prior to forming said pellets.

9. A process as defined in claim 7, in which the particles of carbonaceous reductant are heated after formation of said pellets.

* * * * *

UNITED STATES PATENT OFFICE
CERTIFICATE OF CORRECTION

Patent No. 3,653,876      Dated April 4, 1972

Inventor(s) Fritz O. Wienert

It is certified that error appears in the above-identified patent and that said Letters Patent are hereby corrected as shown below:

Column 3, line 30, by changing "-24" to -200.

Column 3, line 49, by changing "screen" to screened.

Column 4, line 67, by inserting "by" before up.

Claim 3, line 7, by inserting "from" before 1.

Claim 7, line 4, by inserting "major" before portion.

Signed and sealed this 22nd day of August 1972.

(SEAL)
Attest:

EDWARD M. FLETCHER, JR.
Attesting Officer

ROBERT GOTTSCHALK
Commissioner of Patents

UNITED STATES PATENT OFFICE
CERTIFICATE OF CORRECTION

Patent No. 3,653,876            Dated  April 4, 1972

Inventor(s) Fritz O. Wienert

It is certified that error appears in the above-identified patent and that said Letters Patent are hereby corrected as shown below:

Claim 3, line 6, after "oxide", insert -- to metallic iron -- . Claim 7, line 4, after "oxide", insert -- to metallic iron -- ; line 5, insert a comma -- , -- after "material" .

Signed and sealed this 2nd day of January 1973.

(SEAL)
Attest:

EDWARD M. FLETCHER, JR.                ROBERT GOTTSCHALK
Attesting Officer                      Commissioner of Patents